Jan. 29, 1952   G. P. HENSLEY ET AL   2,583,648
POWDER CONVEYING METHOD AND APPARATUS
Filed Dec. 21, 1948   2 SHEETS—SHEET 2
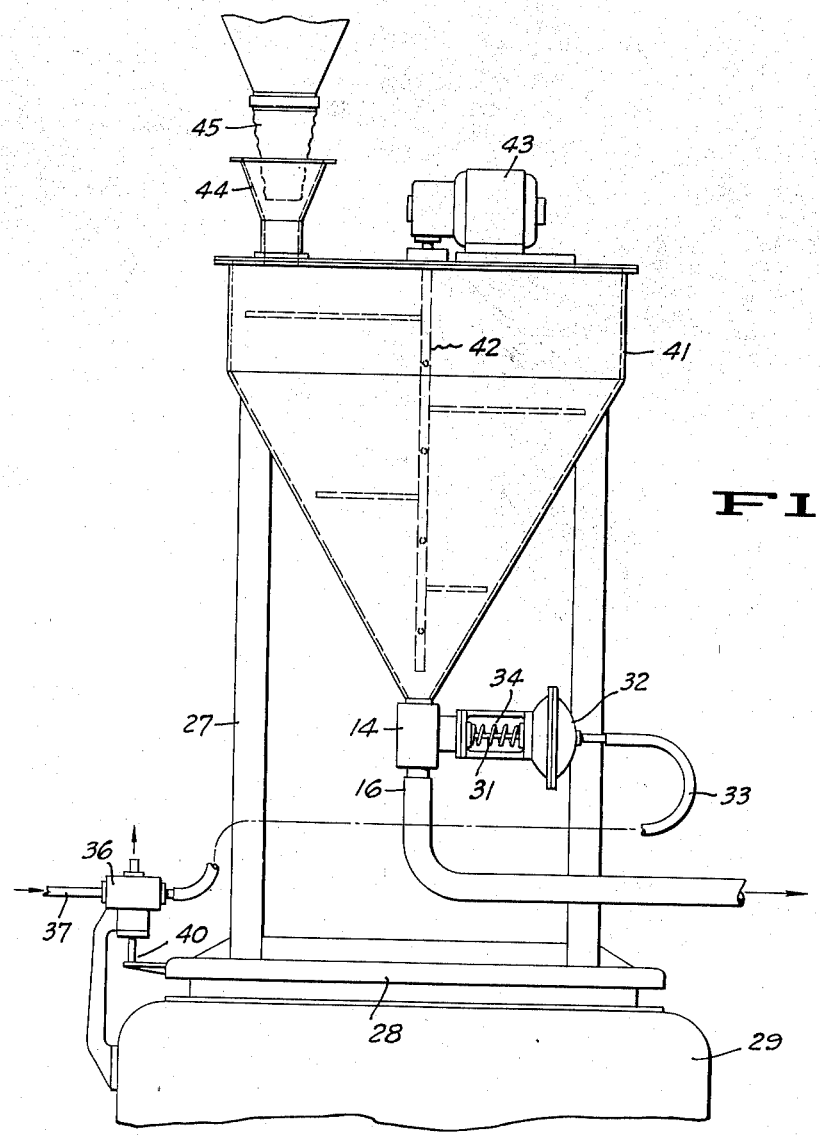
FIG_2_
INVENTORS
Guy P. Hensley
Del O. Johnson
BY
ATTORNEYS Patented Jan. 29, 1952

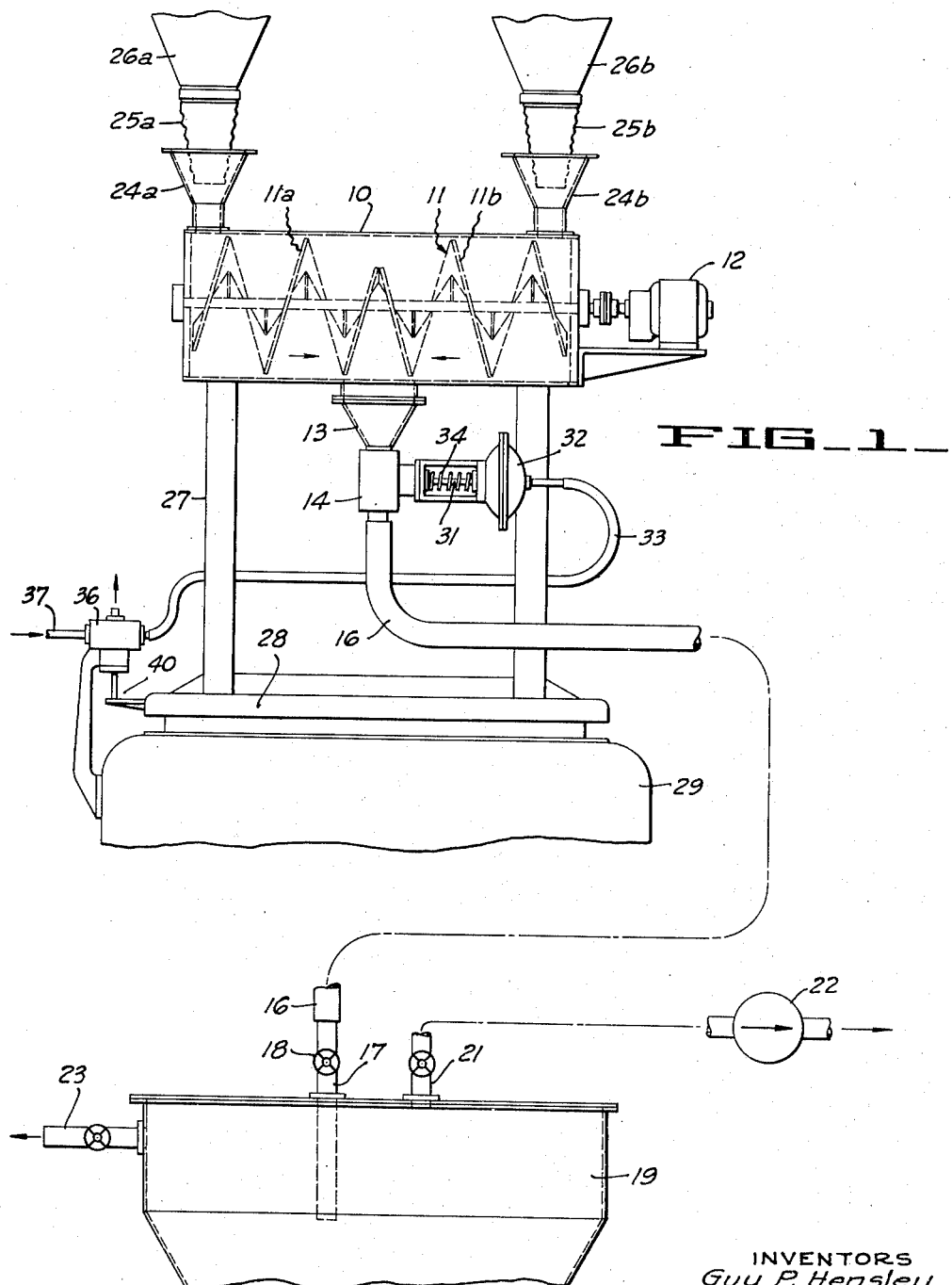

2,583,648

UNITED STATES PATENT OFFICE 2,583,648

POWDER CONVEYING METHOD AND APPARATUS

Guy P. Hensley, San Francisco, and Del O. Johnson, Loleta, Calif., assignors to Golden State Company, Ltd., San Francisco, Calif., a corporation of Delaware Application December 21, 1948, Serial No. 66,424

5 Claims. (Cl. 302—52)

This invention relates generally to methods and apparatus for conveying various powdered materials, and is applicable to industrial plants for conveying powder from one processing step to the next, or from a storage bin to containers for shipment.

In the past various mechanical appliances have been used for conveying powdered materials, as for example feed screws, belt or shaker conveyers, and the like. There are many disadvantages to such equipment, including for example the difficulty of making installations in many instances, limitations as to capacity, objectionable changes to the powder because of attrition and exposure, and lack of adaptability with respect to the levels and locations of the points between which the powder can be conveyed. Pneumatic conveying equipment has also been used, in which the powder is suspended in a current of air or gas, and is blown through conveying conduits. A characteristic of such pneumatic equipment is that the ratio between solid particles and the conveying air or gas is relatively low, or in other words, large volumes of gas are required for conveying or floating a given amount of powder. Generally a cyclone or like type of separator is required at the discharge end of the flow conduit for removing the suspended powdered material from the gas.

Both mechanical and pneumatic conveying devices such as have been used in the past have disadvantages when applied to powdered materials which deteriorate when exposed to the air, such as powdered whole milk. In addition, many such appliances fail to transfer the powder uniformly, and portions of material accumulate in the equipment and are delayed for greater or lesser periods of time during which the powder is exposed to air.

The present invention makes use of air or gas for conveying the powder through an extended circuit, but instead of utilizing large volumes of conveying air we utilize only the air inherently trapped in the powder, and this air is progressively expanded through the length of the conveying conduit by evacuating the discharge end. When utilizing our method and equipment a particular problem is involved in securing proper uniform feed of the powder to the inlet end of the conduit. The inlet end must be blocked or submerged in a mass of the powder. However in practice channeling may occur through the powder to the inlet with resulting loss of vacuum at the discharge end due to direct inflow of atmospheric air. This also interferes with proper flow of powder into the conduit and thus prevents the desired conveying action.

In general it is an object of the present invention to provide a new method and apparatus for conveying powdered materials, particularly materials like powdered whole milk, which will insure a proper feed of powder to the inlet end of a pneumatic conveying conduit, thus making it possible to utilize only naturally entrapped expansible air or gas for conveying the powder to the conduit, and also facilitate the maintenance of a relatively high vacuum at the discharge end of the conduit without exhausting excessively large quantities of air or gas.

Another object of the invention is to provide a method and apparatus of the above character which operates automatically, and which will serve to automatically regulate itself to accommodate intermittent discharge from the conduit.

Additional objects of the invention will appear from the following description in which the preferred embodiment has been set forth in detail in conjunction with the accompanying drawing.

Referring to the drawing:

Fig. 1 is a side elevational view diagrammatically illustrating apparatus incorporating the present invention, and for carrying out the present method.

Figure 2 is a side elevational view diagrammatically illustrating a modification of the invention.

The present method can be best understood after a description of the apparatus illustrated in the drawing. The apparatus of Figure 1 utilizes a vessel 10, which in this instance is in the form of a horizontally disposed cylindrical container forming a housing for the inner screw agitator or scroll 11. The central shaft for the scroll 11 is operatively attached to suitable means for rotating the same, such as a gear reduction type of electric motor 12. It will be noted that the scroll 11 is formed in two helicoidal sections 11a and 11b, which are formed oppositely whereby when the shaft or scroll is turned by the motor 12, the powder within the vessel 10 is continually stirred and urged in opposite directions from the end portions, toward the central or intermediate discharge hopper 13.

The lower end or outlet of the hopper 13 connects through the valve 14 with an extended conveying conduit 16. It is desirable that the conduit 16 be formed of relatively resilient material, such as synthetic rubber. Its walls should have sufficient strength to resist collapsing when a relatively high vacuum is applied to its discharge end.

The equipment attached to the discharge end of the conduit 16 may vary in different instances, but in general we provide a vessel or container for receiving the powder, and a connection from the container to a vacuum or exhaust pump. Thus conduit 16 is shown attached to the pipe 17, which is provided with a simple control valve 18, and which extends down through the top of receiving vessel 19. Pipe 21 connects with the upper portion of the vessel 19 and extends to an evacuating or exhaust pump 22 of suitable capacity. Various types of exhausting pumps can be used, including pumps of the mechanical type, and exhausting devices of the steam jet type. Vessel 19 can be located a considerable distance from the vessel 10, and either above or below the level of the latter. A valve controlled pipe 23 permits venting of the vessel 19 to the atmosphere. The lower end of the vessel can be provided with a powder discharge outlet.

Suitable means is provided for admitting powder to the vessel 10 from a preceding piece of equipment. Thus hoppers 24a and 24b are shown connected to the ends of the vessel 10, and these hoppers receive powder from the cloth socks 25a, 25b, which are attached to the lower ends of the hoppers 26a, 26b. Hoppers 26a and 26b may be cyclones connected to equipment such as a spray dryer or desiccator.

The vessel 10 and the parts directly associated with the same are shown supported by the frame 27, which in turn is supported by the platform 28 of a pair of balancing scales 29. It will be evident that the over-all weight applied to the platform 28 is dependent upon the quantity of powder in the vessel 10.

The valve 14 is of such a character that it can be automatically moved between full open and closed positions, as well as intermediate throttling positions. It should be designed to enable passing of powder without blocking. For example it may be a valve having a rubber disc which can be pressed down to close upon a transverse barrier, or a valve having a rubber tube which can be pinched or collapsed to closed position by clamping means. As illustrated the valve is motor operated in that its movable operating stem 31 is attached to a pneumatic pressure operated device 32. The device 32 in this instance consists of a conventional flexible diaphragm having a closed chamber upon one side of the same which is connected to the pipe 33. A suitable loading force is applied to the diaphragm, as by means of the compression spring 34. Pipe 33 connects to a control valve 36 of the supply and waste type, which in turn connects with the constant pressure air supply line 37. The operating member 40 of the valve 36 has a mechanical connection with the scale platform 28 as diagrammatically illustrated.

As is well known to those familiar with the operation of remotely controlled motor valves, the valve 36 is provided with a tapered or characterized valve member which is positioned according to the positioning of platform 28. It is also provided with an atmospheric vent, and the arrangement is such that for a given position of the valve plug, air supplied from line 37 causes a given pressure to be applied to the line 33, the particular pressure value depending upon the amount venting to the atmosphere from valve 36, and the restriction offered by valve 36 to communication between pipe 37 and pipe 33. When the platform 28 raises, the valve member of control valve 36 reduces the amount of venting to the atmosphere and thus a greater amount of pressure is applied to line 33. This in turn changes the setting of valve 14, to reduce flow through the same. If the platform 28 raises sufficiently far, the pressure applied to the motor device 32 is sufficient to close the valve 14.

Operation of the apparatus described above is as follows: Normally the motor 12 is in continuous operation with the powder being continually stirred and urged toward the central portion of this vessel, to completely fill and overlie the hopper 13. The amount of powder normally in the vessel 10 may be, for example, from 50 to 75% of the total capacity of the vessel. It will be assumed that the pump 22 is in operation, valve 18 open, and that the capacity of the pump is such that a vacuum of the order of 13 inches of mercury is maintained in the vessel 19. The balancing scales 29 should be adjusted so that they balance for a safe minimum amount of powder in the vessel 10, as for example when the vessel is about half filled with the powder. The attachment between the control valve 36 and the platform 28 can be such that when the scales are substantially balanced, the pressure transmitted to the motor device 32 through line 33 is sufficient to maintain valve 14 in a position intermediate full open and closed positions. Application of vacuum to the discharge end of the conduit 16 causes powder to be drawn from the vessel 10 through valve 14, and then through the length of the conduit 16. As the powder leaves the bulk of the mass in the hopper 13, the air naturally entrapped with the powder expands to cause the particles of powder to be separated, and this expansion continues progressively as the air and powder flow through the length of the conduit 16. It is the expanding trapped air which causes conveyance of the powder through the conduit, and there is a total absence of extraneous air or gas.

A relatively compact mass of powder is at all times maintained in hopper 13 and in the central region of the vessel 10, because of the action of the scroll 11 in continually stirring the powder and in continually urging the powder towards the central portion of the vessel and specifically toward that region immediately overlying hopper 13.

If because of a partial or complete failure of powder supply to the hoppers 24a and 24b, the amount of powder in the vessel 10 decreases below a safe value, the platform 28 raises, with the result that the supply and waste valve 36 supplies a reduced pressure to line 33, and the motor device 32. This results in closure of the valve 14 to shut off flow of powder. Thus flow of powder is automatically discontinued until sufficient additional powder has been supplied to the vessel 10.

If the amount of powder in vessel 10 increases above that required to balance the scales, then the platform 28 is lowered, and as a result the pressure supplied to line 33 and device 32 in increased to completely open the valve 14.

It will be evident that the character of the automatic control and its manner of adjustment can vary in different instances. Instead of operating the valve 14 pneumatically in response to the weight of the vessel 10, and the parts associated with the same, the control can be carried out by the use of known types of electrical circuits, with electrical motive means for the valve 14. Likewise it is possible to provide a direct mechanical means between the platform 28 and the valve 14 to cause operation of the valve in the desired manner. With respect to adjustment of the automatic control, valve 14 can be adjusted to normally operate at full open position, and to completely close when the amount of powder in the vessel 10 has fallen to a predetermined minimum value such as for example one-half the total volume of the vessel 10.

In actual practice vessel 10 can be of sufficient capacity to hold say 25 lbs. of the powdered material, which may be whole milk powder. The arrangement can be such that during a period of transfer, a more or less continuous flow of powder carries into the vessel 10 from the socks 25a and 25b.

In many instances it is desirable to withdraw the powder from the receiving vessel 19 intermittently, between periods of filling. Thus after a filling operation valve 18 is closed, and after closing the line 21 to interrupt communication with exhaust pump 22, the valve controlled vent pipe 23 is opened to permit the interior of the vessel to be vented to the atmosphere. When the interior of the vessel reaches atmospheric pressure, the powder contained in the same can be withdrawn by gravity through its lower outlet. To commence a new filling operation vent pipe 23 is closed, pipe 21 is opened, and after a relatively high vacuum has been attained in the vessel 19, as for example 29.5 inches of mercury, the valve 18 is opened to start the conveying operation. The pump 22 should have sufficient capacity so that during a filling operation, it maintains a sufficient vacuum in the vessel for proper transfer of powder. For example in a typical instance the vacuum in vessel 19 will not fall below about 13 inches of mercury during filling.

Figure 2 illustrates another embodiment of the invention. In this instance in place of using the vessel 10, together with the scroll 11, we employ the vessel 41, which has its lower end connected with the control valve 14. An agitator 42 extends downwardly into the vessel 41, and is driven by suitable means such as the reduction gear type of electric motor 43. The inlet hopper 44 for the vessel 41 receives powder from the sock 45, in the same manner as in Figure 1.

The arrangement of Figure 2 operates in a manner similar to Figure 1, in that the control is adjusted whereby when a minimum amount of powder remains in the vessel 41, below which channeling might result above the valve 14, valve 14 is automatically shut off to reduce or arrest the flow of powder to the conduit 16.

The method and apparatus described above possesses many inherent advantages. As previously explained, within the conduit 16 and while powdered material is flowing through the same, the only gas with the powder is the entrapped gas associated with the powder as the powder comes to the inlet end of the conduit. Thus the ratio between solids and gas is relatively high. For example when in any one instant the amount of flowing powder in the conduit is permitted to become static, it may occupy from about 35 to 50% of the total volumetric capacity of the conduit. This is in sharp contrast with prior pneumatic conveying methods previously described, where relatively small amounts of powder are conveyed by relatively large volumes of gas.

Our invention is applicable to a variety of powdered materials of the type normally having a substantial amount of entrapped air between the particles. For example it has been successfully applied to various powdered milk products, such as powdered skim and whole milk. It has also been successfully applied to cereal flours such as common white wheat flour. It cannot be used with granular crystal materials, such as granulated cane sugar.

A surprising feature of the invention is that there is no tendency toward caking and clogging, even though a considerable quantity of powder is permitted to come to rest within the conduit, between periods of powder movement. This is attributed to the continuous and progressive expansion of entrapped gas as the powder moves through the conduit, and which promptly causes a progressive increase in the mean distance between the particles. Although there is some relative movement between the particles, there is no appreciable attrition and the particles are not broken down into small dust particles to any noticeable extent. Another surprising feature of the method is the almost incredible manner in which it conducts powder through small openings or conduits. For example powders may be readily conducted through openings or conduits $\frac{1}{32}$nd of an inch or less in diameter.

With our method the product is conducted without exposure to the outside air thereby obviating any chance for contamination by dust or microorganisms. Furthermore there is no possibility for moisture absorption or undesired change of moisture content. There is no opportunity for the finely divided materials to escape from the apparatus into the rooms within or through which the powder is being conveyed. There is no difficult powder separating problem at the discharge end, in contrast with the separating problem encountered when powdered materials are floated or suspended in large volumes of conveying air. This is because the powder discharges from the conduit in the form of a substantially compact jet, to deposit as a mass into the lower part of the receiver 19.

Because of its advantageous features and the ease with which it permits moving of powder from one place to another, our invention can be used in a variety of industrial applications. There appears to be no limit with respect to the relative levels or locations of the stations between which the powder is to be conveyed and because conduit 16 is a simple hose of flexible material like synthetic rubber, it can be extended along any path desired, irrespective of whether the path is linear, curved or extended around corners or obstructions.

We claim:

1. In apparatus for conveying powdered material, a vessel into which powder can be supplied, a conveying conduit communicating with the lower portion of the vessel, said conduit being adapted to be evacuated at its discharge end, a valve adapted to control flow of powder through the conduit, and means serving to automatically move said valve toward closed position responsive to a reduction in the quality of powder in said vessel.

2. In apparatus for the conveying of powder, a vessel adapted to receive powder, a conveying conduit having its inlet end communicating with the lower portion of said vessel, the discharge end of said conduit being adapted to be evacuated for conveying powder through the same, a valve serving to control flow of powder to the inlet end of the conduit, and means responsive to a variation in the weight of the powder in said vessel for controlling operation of said valve, said means serving to move said valve toward closed position in the event the amount of said powder in said vessel is reduced.

3. Apparatus as in claim 2 together with means for maintaining the powder in the vessel in a continual state of movement.

4. In apparatus for conveying powder, a vessel adapted to receive powder, a conveying conduit having its inlet end communicating with the lower portion of the vessel, the discharge end of said conduit being adapted to be evacuated, a control valve serving to control flow of powder from the vessel to the inlet end of the conduit, means communicating with the laterally spaced end portions of said vessel for receiving powder, and means within the vessel for continually stirring and urging powder from the ends thereof towards the middle region of the vessel, for subsequent flow of powder through the valve and said conduit, and means responsive to a variation in the weight of powder in the vessel for actuating said valve, said last means serving to move said valve toward closed position responsive to decrease of the amount of powder in the vessel.

5. In apparatus for conveying powder, a powder receiving vessel, means communicating with laterally spaced end portions of the vessel for receiving powder, means for continually stirring powder in the vessel and for urging said powder towards the central portion of the vessel, an outlet opening in the lower side of the vessel intermediate its ends, a flow control valve communicating with said outlet, a conveying conduit having its inlet end communicating with the discharge side of said valve and having its discharge end adapted to be connected to an evacuated receiving vessel, weighing means serving to support said vessel and parts attached to the same, and means actuated by said weighing means for controlling operation of said control valve, said last means serving to move said control valve toward closed position when the weight of said vessel and its contents is reduced.

GUY P. HENSLEY.
DEL O. JOHNSON.

REFERENCES CITED

The following references are of record in the file of this patent:

UNITED STATES PATENTS

| Number | Name | Date |
|---|---|---|
| 768,692 | Provast | Aug. 30, 1904 |
| 773,852 | Cutting | Nov. 1, 1904 |
| 1,098,873 | Allen | June 2, 1914 |
| 1,385,870 | Gieseler | July 26, 1921 |